(12) United States Patent
Takamatsu et al.

(10) Patent No.: US 9,527,474 B2
(45) Date of Patent: Dec. 27, 2016

(54) WEBBING TAKE-UP DEVICE

(75) Inventors: Hitoshi Takamatsu, Aichi-ken (JP); Akira Sumiyashiki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 647 days.

(21) Appl. No.: 13/323,915

(22) Filed: Dec. 13, 2011

(65) Prior Publication Data

US 2012/0153066 A1    Jun. 21, 2012

(30) Foreign Application Priority Data

Dec. 20, 2010  (JP) ................................. 2010-283650

(51) Int. Cl.
   *B65H 75/30*    (2006.01)
   *B60R 22/36*    (2006.01)
   *B60R 22/405*   (2006.01)

(52) U.S. Cl.
   CPC .............. *B60R 22/36* (2013.01); *B60R 22/405* (2013.01)

(58) Field of Classification Search
   CPC ................. B60R 22/34; B60R 22/36–22/405; B60R 2022/3402
   USPC .......... 242/376, 379, 383.4, 384.6; 280/806, 280/807; 297/476–478
   See application file for complete search history.

(56) References Cited

U.S. PATENT DOCUMENTS

| | | | |
|---|---|---|---|
| 4,603,819 A * | 8/1986 | Loose et al. | 242/379 |
| 4,619,419 A | 10/1986 | Essler | |
| 4,620,357 A * | 11/1986 | Fohl | 29/439 |
| 4,809,925 A * | 3/1989 | Takada | 242/372 |
| 5,452,863 A * | 9/1995 | Hardy, Sr. | 242/376 |
| 5,480,105 A * | 1/1996 | Fujimura et al. | 242/383.2 |
| 6,241,173 B1 * | 6/2001 | Wier | 242/382 |

(Continued)

FOREIGN PATENT DOCUMENTS

| | | |
|---|---|---|
| JP | 6-8122 U | 2/1994 |
| JP | 2006-224920 | 8/2006 |

(Continued)

OTHER PUBLICATIONS

Notice of reasons for rejection JP patent application No. 2010-283650 mailed Mar. 4, 2014.

(Continued)

*Primary Examiner* — Emmanuel M Marcelo
*Assistant Examiner* — Justin Stefanon
(74) *Attorney, Agent, or Firm* — Roberts Mlotkowski Safran Cole & Calderon, PC

(57) ABSTRACT

A webbing take-up device including: a take-up shaft on which a webbing is taken up; a lock mechanism including a lock gear disposed at one axial direction end portion of the take-up shaft and formed with ratchet teeth, and a lock plate formed with lock teeth engaging with the ratchet teeth; and a frame including a pair of leg plates disposed at both axial direction end portions of the take-up shaft, an opening portion being formed at a leg plate of the pair of leg plates disposed further to the other axial direction end portion of the take-up shaft than the ratchet teeth and the lock teeth, and the opening portion passing through the leg plate at a position that faces towards a range including a mutual engagement position between the ratchet teeth and the lock teeth and the periphery of the engagement position along the take-up shaft axial direction.

2 Claims, 3 Drawing Sheets

(56) References Cited

U.S. PATENT DOCUMENTS

| | | | |
|---|---|---|---|
| 6,267,315 B1* | 7/2001 | Blackadder et al. | 242/384 |
| 6,412,875 B1* | 7/2002 | Hibata et al. | 297/478 |
| 6,523,771 B2* | 2/2003 | Sumiyashiki | 242/383.2 |
| 6,527,214 B2* | 3/2003 | Sumiyashiki | 242/383.2 |
| 6,871,813 B2* | 3/2005 | Bae | 242/379.1 |
| 2001/0023904 A1* | 9/2001 | Kanamori et al. | 242/379.1 |
| 2003/0116668 A1* | 6/2003 | Sumiyashiki | 242/376 |
| 2014/0091167 A1* | 4/2014 | Rink et al. | 242/384.2 |

FOREIGN PATENT DOCUMENTS

| | | |
|---|---|---|
| JP | 2007-055463 | 3/2007 |
| WO | 2010106183 A1 | 9/2010 |

OTHER PUBLICATIONS

European Search Report Application No. 11193646.4-1523 mailed Mar. 12, 2012.

\* cited by examiner

WEBBING TAKE-UP DEVICE

CROSS-REFERENCE TO RELATED APPLICATION

This application claims priority under 35 USC 119 from Japanese Patent Application No. 2010-283650 filed Dec. 20, 2010, the disclosure of which is incorporated by reference herein.

BACKGROUND

Technical Field

The present invention relates to a webbing take-up device for configuring a vehicle seatbelt apparatus.

Related Art

In a vehicle seatbelt retractor (webbing take-up device) described in Japanese Utility Model Application Laid-Open (JP-U) No. 6-8122, rotation of a take-up shaft in a pullout direction is restricted by an engagement portion (lock teeth of a lock plate) of a pivoted pawl engaging with teeth on a latch plate provided to the take-up shaft (ratchet teeth of a lock gear). In such a retractor, in order to inspect whether the desired setting has been achieved for the gap between the teeth of the latch plate and the engagement portion of the pawl during pawl operation, the gap between the teeth of the latch plate and the engagement portion of the pawl when the spool is operated is sometimes assessed when components configuring a lock mechanism are in an assembled state.

However, in the above retractor, due to the components configuring the lock mechanism and the side plate of the base being disposed at the side of the location to be assessed, when assessing the gap assessment cannot be made from face-on (or in other words by looking along the axial direction of the take-up shaft). This makes it necessary to perform assessment of the gap from a diagonal direction, making assessment difficult.

SUMMARY

In consideration of the above circumstances, the present invention provides a webbing take-up device in which direct assessment of a gap between ratchet teeth of a lock gear and lock teeth of a lock plate can be performed from face-on, facilitating gap assessment.

A webbing take-up device of a first aspect of the present invention is a webbing take-up device including: a take-up shaft on which a webbing is taken up; a lock mechanism comprising a lock gear disposed at one axial direction end portion of the take-up shaft and formed with ratchet teeth, and a lock plate formed with lock teeth capable of engaging with the ratchet teeth, rotation of the take-up shaft in a webbing pullout direction being prevented by the lock teeth engaging with the ratchet teeth under specific circumstances; and a frame comprising a pair of leg plates disposed at both axial direction end portions of the take-up shaft so as to face each other along a take-up shaft axial direction, an opening portion being formed at a leg plate of the pair of leg plates disposed further to the other axial direction end portion of the take-up shaft than the ratchet teeth and the lock teeth, and the opening portion passing through the leg plate at a position that faces towards a range including a mutual engagement position between the ratchet teeth and the lock teeth and the periphery of the engagement position along the take-up shaft axial direction.

According to the first aspect of the present invention, in the lock mechanism the lock teeth of the lock plate are engageable with the ratchet teeth of the lock gear, and rotation of the take-up shaft in a webbing pullout direction is prevented by the lock teeth engaging with the ratchet teeth under specific circumstances. Of the pair of leg plates, an opening portion is formed at the leg plate disposed further to the other axial direction end portion of the take-up shaft than the ratchet teeth and the lock teeth. The opening portion passing through the leg plate at a position that faces towards a range including a mutual engagement position between the ratchet teeth and the lock teeth and the periphery of the engagement position along the take-up shaft axial direction. Therefore, the gap between the ratchet teeth of the lock gear and the lock teeth of the lock plate can accordingly be directly assessed by viewing along the take-up shaft axial direction from the outer side of the leg plate of the pair of leg plates disposed at the opposite side to the lock mechanism.

The webbing take-up device of a second aspect of the present invention is the first aspect of the present invention wherein extending portions that extend towards a radial direction outer side are formed at both axial direction end portions of the take-up shaft, and cut-out portions are formed at the extending portions at positions capable of being disposed so as to face the opening portion along the take-up shaft axial direction.

According to the second aspect of the present invention, extending portions are formed extending towards the radial direction outer side at both axial direction end portions of the take-up shaft. However, due to cut-out portions being formed at the extending portions at positions capable of being disposed so as to face the opening portion along the take-up shaft axial direction, direct assessment can be performed of the gap between the ratchet teeth of the lock gear and the lock teeth of the lock plate by viewing along the take-up shaft axial direction by disposing the cut-out portions so as to face the opening portion along the take-up shaft axial direction.

BRIEF DESCRIPTION OF THE DRAWINGS

Exemplary embodiments of the present invention will be described in detail based on the following figures, wherein.

DETAILED DESCRIPTION

Configuration of Exemplary Embodiments

Figure 2:
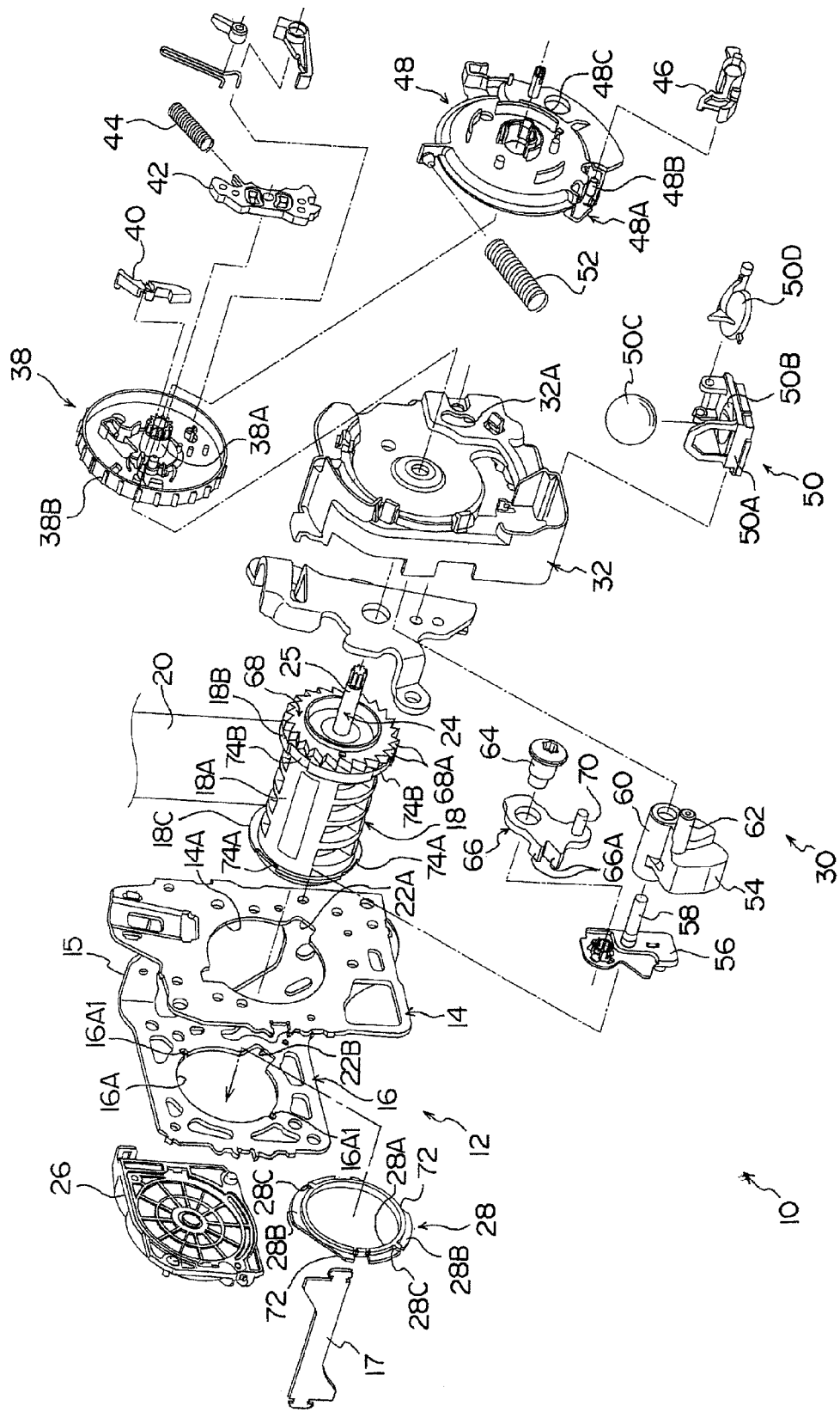
FIG. 2 is an exploded perspective view schematically illustrating a configuration of the webbing take-up device according to the exemplary embodiment of the present invention.

FIG. 2 is an exploded perspective view schematically illustrating an overall configuration of a webbing take-up device 10 according to an exemplary embodiment of the present invention.

As shown in FIG. 2, the webbing take-up device 10 is equipped with a frame 12. The frame 12 is equipped with a flat plate shaped back plate 15 for fixing to a vehicle, such as onto a frame member. The width direction of the back plate 15 faces, for example, substantially along the vehicle front-rear direction. A pair of leg plates 14, 16 are formed at the two width direction edges of the back plate 15, bending around at substantially a right angle so as extend out from the back plate 15 towards the same direction. The pair of leg plates 14, 16 configure portions of the frame 12 and are disposed so as to face each other. Holes 14A, 16A are formed through the pair of leg plates 14, 16 such that a spool 18 serving as a take-up shaft is insertable into the holes 14A, 16A. A support bar 17 spans across at an intermediate portion in the up-down direction between front edge portions of the pair of leg plates 14, 16 (the free edge portions on the opposite side to the back plate 15).

The spool 18 is provided between the leg plate 14 and the leg plate 16 and is formed in a substantially circular cylindrical shape disposed with an axial direction along the mutual facing direction of the leg plates 14, 16. A spool shaft 18A is provided to the spool 18 and configures a shaft core section. Flange portions 18B, 18C serving as extending portions are formed at the two axial direction end portions of the spool 18 so as to extend out towards the radial direction outer side.

A length direction base end side of elongated belt shaped webbing 20 is anchored to the spool 18. The webbing 20 is taken up from the length direction base end side and wound in layers on the outer peripheral section of the spool 18 when the spool 18 is rotated in one direction about the central axial line of the spool 18, this being a webbing take-up direction (referred to below simply as "take-up direction"). However, when the webbing 20 is pulled towards the leading end side of the webbing 20 so as to pull out the webbing 20 that has been taken up on the spool 18, the spool 18 is accordingly rotated in a webbing pullout direction (where appropriate referred to below simply as the "pullout direction"), this being the opposite direction to the take-up direction.

A bar shaped tension shaft 24 is disposed inside the spool 18 with the tension shaft 24 length direction along the spool 18 axial direction. The tension shaft 24 is connected to the spool 18 in the vicinity of an end portion of the spool 18 on the leg plate 16 side, to render a state in which the tension shaft 24 is not relatively rotatable with respect to the spool 18. One axial direction end portion of the tension shaft 24 passes through the hole 14A of the leg plate 14 to as to project outer side the frame 12.

A box shaped spring cover 26 is attached to the leg plate 16, at the outer side of the leg plate 16 of the frame 12. The end portion of the tension shaft 24 on the leg plate 16 side is inserted into the spring cover 26. A helical direction outer side end portion of a helical spring (not shown in the drawings) is anchored to the inside of the spring cover 26. A helical direction inside end portion of the helical spring is mounted to an end portion of the tension shaft 24 on the leg plate 16 side. Biasing force is generated by the helical spring when the tension shaft 24 is rotated together with the spool 18 in the pullout direction, and the biasing force then rotates the spool 18 in the take-up direction through the tension shaft 24. The webbing 20 can thereby be taken up on the spool 18.

A sensor holder 32 of a lock mechanism 30 is attached to the leg plate 14 at the outer side of the leg plate 14 of the frame 12. The sensor holder 32 is covered by a sensor cover, not shown in the drawings, and is rotatably supported on a shaft portion 25 that extends out from the other end portion of the tension shaft 24 and passes through the sensor holder 32.

A V-gear 38 is provided at the side of the sensor holder 32. The V-gear 38 is formed in a shallow bottomed circular cylindrical shape, and a circular cylindrical shaped boss 38A is formed at the V-gear 38 to let the shaft portion 25 pass through, resulting in the V-gear 38 being coaxially and integrally attached to the shaft portion 25. A W-pawl 40 is supported from the V-gear 38, at a position separated from the axial center of the V-gear 38, such that the W-pawl 40 is able to swing about an axial line extending in the same direction as the axial center line of the V-gear 38. Swinging the W-pawl 40 results in the leading end side of the W-pawl 40 moving towards or separating from the outer side edge of the V-gear 38.

An inertia mass 42 is supported from the V-gear 38 so as to be able to rotate about an axial line facing along the same direction as the central axial line of the V-gear 38. The inertia mass 42 presses the W-pawl 40 when the inertia mass 42 is rotated relative to the V-gear 38 in the take-up direction, so as to make the leading end side of the W-pawl 40 approach the vicinity of the outer side edge of the V-gear 38. One end of a compression coil spring 44 is engaged with the inertia mass 42, biasing the inertia mass 42 in the pullout direction.

A sensor gear 48 is provided at the side of the V-gear 38. The sensor gear 48 is formed in a shallow bottomed circular cylindrical shape, and is rotatably supported on the boss 38A of the V-gear 38. A return spring 52 is provided in the vicinity of the sensor gear 48. The return spring 52 increases biasing force when the sensor gear 48 rotates in the pullout direction about the boss 38A, biasing the sensor gear 48 in the take-up direction.

Ratchet teeth, not shown in the drawings, are formed on the inside of the sensor gear 48 coaxially to the boss 38A. The ratchet teeth formed at the sensor gear 48 intrude into the inside of the V-gear 38, and face the W-pawl 40 along the radial direction of the V-gear 38 and the sensor gear 48. The leading end side of the W-pawl 40 engages with the ratchet teeth of the sensor gear 48 when the W-pawl 40 is rotated such that the leading end side of the W-pawl 40 approaches the vicinity of the outer side edge of the V-gear 38. When the V-gear 38 rotates in the pullout direction in a state in which the leading end side of the W-pawl 40 is engaged with the ratchet teeth of the sensor gear 48, the ratchet teeth are pressed by the leading end side of the W-pawl 40, thereby rotating the sensor gear 48 in the pullout direction together with the V-gear 38.

A coupling claw attachment portion 48A is formed at a portion on the outer peripheral side of the sensor gear 48. A support shaft 48B is formed at the coupling claw attachment portion 48A with the axial direction of the support shaft 48B facing along the axial direction of the spool 18. A coupling claw 46 is supported by the support shaft 48B so as to be capable of rotating about the support shaft 48B.

Pivoting of the coupling claw 46 about the support shaft 48B of the coupling claw attachment portion 48A results in the leading end of the coupling claw 46 approaching or separating from an outer peripheral section of the V-gear 38. Ratchet teeth 38B are formed on the outer peripheral section of the V-gear 38 so as to align with the coupling claw 46. The leading end of the coupling claw 46 meshes with the ratchet teeth 38B when the coupling claw 46 pivots so as to approach the vicinity of the outer peripheral section of the V-gear 38. When the V-gear 38 rotates in the pullout direction in this state, the rotation of the V-gear 38 is transmitted to the sensor gear 48 through the ratchet teeth 38B, the coupling claw 46 and the coupling claw attachment portion 48A, thereby rotating the sensor gear 48 in the pullout direction.

An acceleration sensor 50 is provided below the coupling claw 46 inside a sensor cover, not shown in the drawings. The acceleration sensor 50 includes a ball 50C mounted on a mounting section 50B of a sensor housing 50A. A sensor lever 50D is provided above the ball 50C. The sensor lever 50D is supported on the sensor housing 50A so as to be capable of pivoting about an axial line substantially along the vehicle front-rear direction, and is positioned below the coupling claw 46. The leading end of the coupling claw 46 meshes with the ratchet teeth 38B when the coupling claw 46 is pushed up by the leading end of the sensor lever 50D.

A link member 54 is provided at the leg plate 14 side of the sensor gear 48, in the vicinity of the coupling claw attachment portion 48A. A support body 56 is attached to the leg plate 14 of the frame 12 so as to align with the link member 54. A support shaft 58 is provided to the support body 56, with the axial direction of the support shaft 58 facing in the same direction as the central axial line direction of the spool 18. A cylindrical shaped body 60 is formed at the link member 54 so as to be capable of fitting over the support shaft 58. The link member 54 is supported so as to be rotatable about the support shaft 58 by the support shaft 58 being fitted into the cylindrical shaped body 60.

An engagement pin 62 is formed at the link member 54. The engagement pin 62 is formed, at a position separated from the central axial line of the cylindrical shaped body 60, so as to project out along the same direction as the axial direction of the spool 18 towards the sensor gear 48 side. The engagement pin 62 passes through a through hole 32A formed at the sensor holder 32. The through hole 32A is formed curving around in a circular arc shape centered on the central axial lines of the support shaft 58 and the cylindrical shaped body 60. After passing through the through hole 32A the engagement pin 62 also passes through a hole 48C formed at the sensor gear 48.

A lock plate 66 is rotatably supported on the support body 56 by a mounting pin 64 so as to be capable of rotating about an axial direction in the same direction as the axial direction of the support shaft 58. The lock plate 66 is disposed at the outer side of the leg plate 14 (on the opposite side of the leg plate 14 to the leg plate 16 side). A lock gear 68 is disposed at one axial direction end portion (the right hand side in FIG. 2) of the spool 18 in a position aligned with the lock plate 66. The lock gear 68 is configured as a separate body to the spool 18 and is disposed at the outer side of the leg plate 14 (the opposite side of the leg plate 14 to the leg plate 16 side). The lock gear 68 is coaxially disposed and relatively rotatable with respect to the spool 18 and a portion of the lock gear 68 fits through and out from an end opening of the spool 18 at the leg plate 14 side. However the tension shaft 24 passes through the lock gear 68 in a non-relatively rotatable state. The lock gear 68 is accordingly coupled through the tension shaft 24 in a non-relatively rotatable state to the spool 18.

Ratchet teeth 68A are formed at the outer peripheral face of the lock gear 68. Lock teeth 66A formed at the lock plate 66 are hence engageable with (capable of meshing with) the ratchet teeth 68A of the lock gear 68. Namely, the lock teeth 66A of the lock plate 66 mesh with the ratchet teeth 68A of the lock gear 68 when the lock plate 66 rotates in the direction such that the leading end side of the lock plate 66 approaches the vicinity of an outer peripheral section of the ratchet teeth 68A. The lock gear 68 is restricted from rotation in the pullout direction in the state in which the lock teeth 66A of the lock plate 66 are meshed with the ratchet teeth 68A of the lock gear 68.

An engaging pin 70 is formed at the lock plate 66 at a position separated in the radial direction from the center of rotation of the lock plate 66. The engaging pin 70 is formed so as to project out in the same direction as the spool 18 axial direction from the end face of the lock plate 66 on the link member 54 side. The engaging pin 70 is inserted into a not-illustrated guide hole in the link member 54. When the link member 54 rotates in the take-up direction about the support shaft 58 due to the sensor gear 48 rotating in the pullout direction and the engagement pin 62 being pressed by an inner peripheral portion of the hole 48C, an inner peripheral portion of a not-illustrated guide hole formed at the link member 54 presses the engaging pin 70. The lock plate 66 is thereby pivoted in the direction such that the lock teeth 66A of the lock plate 66 approach the vicinity of the ratchet teeth 68A of the lock gear 68, resulting in the lock teeth 66A engaging with the ratchet teeth 68A. Namely, in the lock mechanism 30, under certain circumstances the lock teeth 66A of the lock plate 66 engage with the ratchet teeth 68A of the lock gear 68, such that rotation of the spool 18 in the webbing pullout direction is prevented by such engagement.

Of the pair of leg plates 14, 16 in the frame 12, cut-out windows 22A, 22B serving as an opening portion is formed at the leg plate(s) disposed further to the other spool 18 axial direction end portion (the left hand side in FIG. 2) than the side of the ratchet teeth 68A of the lock gear 68 and the lock teeth 66A of the lock plate 66 (this is both the leg plates 14, 16 in the present exemplary embodiment). In FIG. 2, the cut-out window formed at the leg plate 14 is illustrated with the reference numeral 22A, and the cut-out window formed at the leg plate 16 is illustrated with the reference numeral 22B. In the present exemplary embodiment, the cut-out windows 22A, 22B are formed by further cutting away a portion from each of the holes 14A, 16A.

Figure 1:
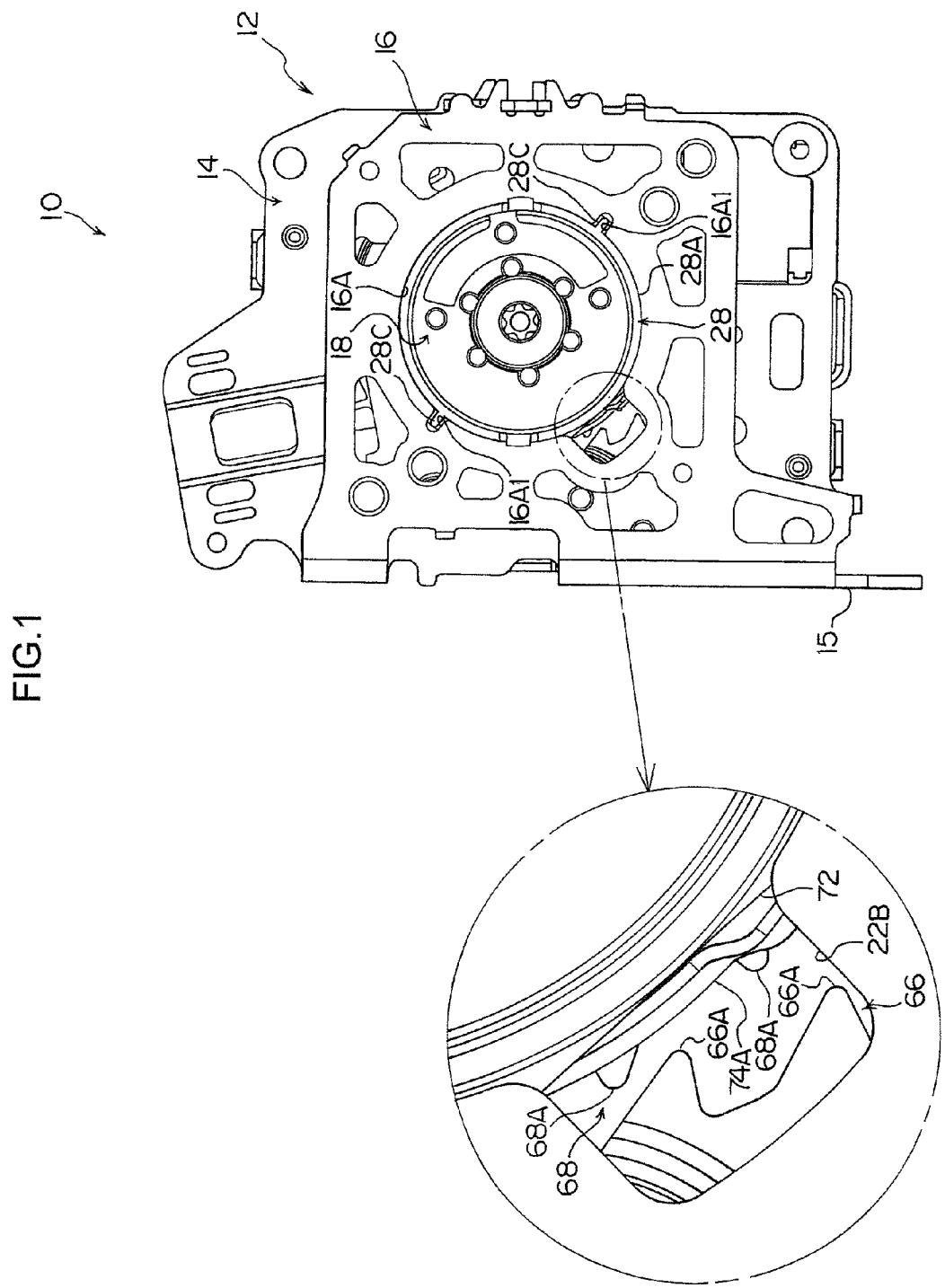
FIG. 1 is a side view illustrating a webbing take-up device according to an exemplary embodiment of the present invention in state prior to spring cover assembly.

In FIG. 1 the webbing take-up device 10 is illustrated in side view in a state prior to attaching the spring cover 26 (see FIG. 2). As shown in the partial enlargement of FIG. 1, the cut-out window 22B passes through the leg plate 16 at a position facing towards a range including the mutual engagement position of the ratchet teeth 68A and the lock teeth 66A and the periphery of the engagement position (a range including the position of the leading end portion of the engaged-state lock teeth 66A and the position of the leading end portion of the ratchet teeth 68A adjacent to the engaged-state lock teeth 66A) along the spool 18 axial direction. The size of the cut-out window 22B is set such that two teeth worth of teeth tips of the lock teeth 66A of the lock plate 66 are visible when viewed along the spool 18 axial direction. The cut-out window 22A (see FIG. 2) too, similarly to the cut-out window 22B shown in FIG. 1, also passes through the leg plate 14 at a position facing towards a range including the mutual engagement position of the ratchet teeth 68A and the lock teeth 66A and the periphery the engagement position (a range including the position of the leading end portion of the engaged-state lock teeth 66A and the position of the leading end portion of the ratchet teeth 68A adjacent to engaged-state lock teeth 66A) along the spool 18 axial direction. The size of the cut-out window 22A is also set such that two teeth worth of teeth tips of the lock teeth 66A of the lock plate 66 are visible when viewed along the spool 18 axial direction. Namely, the cut-out windows 22A, 22B illustrated in FIG. 2 function as inspection holes for inspecting the gap (gap dimension) between the ratchet teeth 68A of the lock gear 68 and the lock teeth 66A of the lock plate 66 when the lock mechanism 30 is in an assembled state.

As shown in FIG. 1 and FIG. 2, a ring shaped bush 28 is mounted at an inner peripheral portion of the hole 16A of the leg plate 16. The bush 28 illustrated in FIG. 2 is mounted to the inner peripheral portion of the hole 16A of the leg plate 16 by first reversing the front-back orientation of the bush 28 shown in FIG. 2. The bush 28 is a resin component employed for noise reduction, and is equipped with a cylindrical portion 28A formed in a substantially circular short cylindrical shape and making contact with the inner peripheral face of the hole 16A, and a flange portion 28B extending out from one axial direction end portion of the cylindrical portion 28A towards the radial direction outer side.

Mounting projections 28C are formed projecting out from plural locations at the outer peripheral face side of the cylindrical portion 28A (two locations one at each side of the axial center of the cylindrical portion 28A in the present exemplary embodiment). As shown in FIG. 1, the projections 28C are formed so as to fit inside mounting recesses 16A1 formed out from the hole 16A of the leg plate 16. The flange portion 28B illustrated in FIG. 2 is disposed at the inside face of the leg plate 16 (the side of the leg plate 16 facing towards the leg plate 14), and cut-outs 72 are formed by cutting the flange portion 28B along a straight line at plural locations (two locations one at each side of the axial center of the cylindrical portion 28A in the present exemplary embodiment). As shown in FIG. 1, one of the cut-outs 72 is disposed at a position aligned with the cut-out windows 22A, 22B (see FIG. 2 for the cut-out window 22A) when the bush 28 is in its mounted state. The bush 28 in the present exemplary embodiment is configured to also enable mounting at a rotation of 180° about the axial center of the bush 28 from the mounting position illustrated in FIG. 1.

Figure 3:
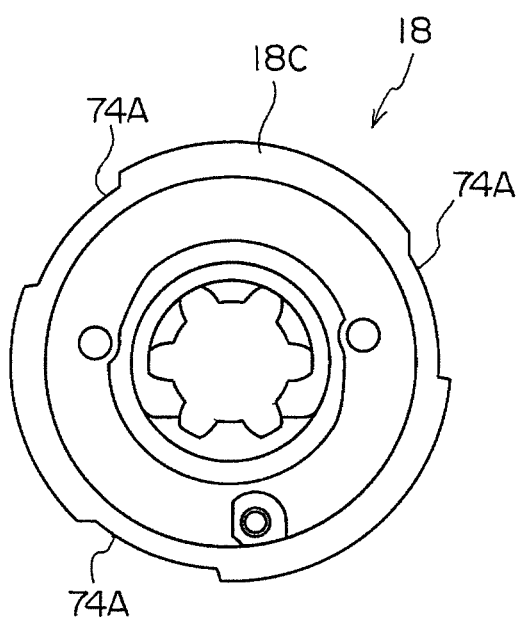
FIG. 3 is a side view illustrating the spool of FIG. 1 as viewed along the same direction as in FIG. 1.

Cut-out portions 74A, 74B (see FIG. 2) are also formed at the spool 18 so as to partially align with the cut-outs 72 of the bush 28. FIG. 3 illustrates the spool 18 in side view as viewed along the same direction as FIG. 1. As shown in FIG. 2 and FIG. 3, the cut-out portions 74A, 74B are formed so as to configure circular arc shaped cut-outs in the flange portions 18B, 18C at plural locations (at three locations each in the present exemplary embodiment) at positions capable of being disposed so as to face the cut-out windows 22A, 22B along the spool 18 axial direction.

Operation and Effect of the Exemplary Embodiment

Explanation follows regarding operation and effect of the above exemplary embodiment.

A brief explanation follows first regarding operation of the lock mechanism 30 illustrated in FIG. 2. In the webbing take-up device 10 according to the present exemplary embodiment, when a vehicle enters a state of rapid deceleration, the ball 50C of the acceleration sensor 50 rolls so as to rotate the sensor lever 50D. The sensor lever 50D is accordingly pivoted so as to engage with the coupling claw 46 of the sensor gear 48 and push the coupling claw 46 upwards. The coupling claw 46 accordingly meshes with the ratchet teeth 38B of the V-gear 38.

The spool 18 attempts to rotate in the pullout direction due to tension force of the webbing arising from an occupant attempting to move towards the vehicle front-side under inertia. In such a situation the tension shaft 24 rotates in the pullout direction together with the spool 18, resulting in the V-gear 38 also being rotated in the pullout direction. When the V-gear 38 is rotated in the pullout direction with an acceleration of a specific magnitude or greater, due to inertia the inertia mass 42 becomes unable to follow such rotation and attempts to hold position, resulting in the inertia mass 42 rotating relatively in the take-up direction with respect to the V-gear 38.

When this occurs the inertia mass 42 presses the W-pawl 40, rotating the W-pawl 40 about the base end side of the W-pawl 40 such that the leading end side of the W-pawl 40 approaches the vicinity of the outer peripheral edge of the V-gear 38. The leading end side of the W-pawl 40 accordingly approaches the vicinity of the ratchet teeth of the sensor gear 48 and meshes with the ratchet teeth.

If the V-gear 38 rotates in the pullout direction with the coupling claw 46 in the meshed state with the ratchet teeth 38B of the V-gear 38 and the leading end side of the W-pawl 40 in the meshed state with the ratchet teeth of the sensor gear 48, as explained above, then such rotation of the V-gear 38 in the pullout direction is transmitted to the sensor gear 48, resulting in the sensor gear 48 rotating together with the V-gear 38 in the pullout direction against biasing force from the return spring 52.

In such circumstances the inner peripheral portion of the hole 48C formed at the sensor gear 48 presses an external peripheral portion of the engagement pin 62, rotating the link member 54 in the pullout direction. The inner peripheral portion of a not-illustrated guide hole formed at the link member 54 presses an external peripheral portion of the engaging pin 70, rotating the lock plate 66 in the take-up direction. The lock teeth 66A of the lock plate 66 mesh with the ratchet teeth 68A of the lock gear 68, and the lock plate 66 restricts rotation of the lock gear 68 in the pullout direction.

Rotation of the spool 18 in the pullout direction is then also prevented (restricted) due to the lock gear 68 being coupled in a non-relatively rotatable state to the spool 18 through the tension shaft 24, restricting rotation of the lock gear 68 in the pullout direction. Accordingly, since rotation to pull the webbing 20 out from the spool 18 is restricted, for example, the body of an occupant attempting to move towards the vehicle front-side under inertia due to a vehicle entering a state of rapid deceleration is firmly restrained by the webbing 20.

Explanation follows regarding assessing the gap during lock plate 66 operation between the ratchet teeth 68A of the lock gear 68 and the lock teeth 66A of the lock plate 66 (the phase of the lock gear 68 and the lock plate 66).

As described above, in the webbing take-up device 10 according to the present exemplary embodiment, cut-out window(s) 22A, 22B are formed at the leg plate(s) of the pair of leg plates 14, 16 of the frame 12 disposed further towards the other spool 18 axial direction end portion (the left hand side in FIG. 2) than the ratchet teeth 68A of the lock gear 68 and the lock teeth 66A of the lock plate 66 (both the leg plates 14, 16 in the present exemplary embodiment), and the cut-out windows 22A, 22B are formed to pass through the leg plates at positions facing towards a range including the mutual engagement position between the ratchet teeth 68A and the lock teeth 66A and the periphery of the engagement position along the spool 18 axial direction. Accordingly, after assembling components (sensor components) configuring the lock mechanism 30 and before assembling the spring cover 26 on the outer side of the leg plate 16, direct assessment can be made of the gap between the ratchet teeth 68A of the lock gear 68 and the lock teeth 66A of the lock plate 66 by, as shown in FIG. 1, viewing along the spool 18 axial direction through the frame 12 from the opposite side to the sensor holder 32 (see FIG. 2) side.

As shown in FIG. 2, the flange portions 18B, 18C are formed extending towards the radial direction outer side from both axial direction end portions of the spool 18. However, since the cut-out portions 74A, 74B are formed at the flange portions 18B, 18C at positions capable of being disposed to face the cut-out windows 22A, 22B along the spool 18 axial direction, direct assessment can be made of the gap between the ratchet teeth 68A of the lock gear 68 and the lock teeth 66A of the lock plate 66 by disposing the cut-out portions 74A, 74B so as to face the cut-out windows 22A, 22B along the spool 18 axial direction and then viewing along the spool 18 axial direction.

As explained above, according to the webbing take-up device 10 of the present exemplary embodiment, assessment of the gap between the ratchet teeth 68A of the lock gear 68 and the lock teeth 66A of the lock plate 66 can be facilitated due to the ability to directly assess the gap from face-on (by viewing along the spool 18 axial direction).

Furthermore, since gap inspection can be performed prior to assembly of such components as the webbing and tongue, rather than after such assembly, even supposing a requirement to redo assembly operation(s) was to arise, cost can be reduced in comparison to when gap inspection is performed after assembly of components such as the webbing and tongue.

Supplementary Explanation of the Exemplary Embodiment

In the above exemplary embodiment, the lock gear 68 is inserted coaxially to the spool 18, however configuration may be made such that, for example, a lock gear is configured by a lock gear formed with ratchet teeth (internal ratchet teeth) on the inner peripheral face of a hole formed at a frame leg plate. Configuration may also be made with the lock plate provided to the take-up shaft.

In the above exemplary embodiment the cut-out windows 22A, 22B are formed as opening portions in both of the pair of leg plates 14, 16, however, for example, consider a case in which only one of the pair of leg plates of the frame is disposed further to the other axial direction end portion of the take-up shaft than the ratchet teeth of the lock gear and the lock teeth of the lock plate. Configuration may be made in such a case with the leg plate opening portion for inspecting the gap between the ratchet teeth of the lock gear and the lock teeth of the lock plate (namely an opening portion passing through the leg plate at a position facing a range including the mutual engagement position between the ratchet teeth and the lock teeth and the periphery of the engagement position along the take-up shaft axial direction) formed only to one of the leg plates.

Furthermore, in the above exemplary embodiment, the cut-out windows 22A, 22B are formed by further cutting away a portion from each of the holes 14A, 16A, however, depending on the size of the lock gear and the disposed position of the lock plate, the opening portion formed at the leg plates for inspecting the gap between the ratchet teeth of the lock gear and the lock teeth of the lock plate may be configured, for example, as a through hole formed at a position separated from the holes (14A, 16A) formed at the frame leg plates.

In the above exemplary embodiments the cut-out portions 74A, 74B are formed at the flange portions 18B, 18C of the spool 18 at positions capable of being disposed to face the cut-out windows 22A, 22B along the spool 18 axial direction. However, for example, configuration may be made such that cut out portions are not formed at extending portions of the take-up shaft in cases in which configuration is such that a portion of the take-up shaft does not overlap with the range including the mutual engagement position between the ratchet teeth and the lock teeth and the periphery of the engagement position when viewed along the take-up shaft axial direction.

Furthermore, in the above exemplary embodiments, the cut-out windows 22A, 22B are set with a size such that two teeth worth of tooth tips of the lock teeth 66A formed at the lock plate 66 can be seen when viewed along the spool 18 axial direction. Whilst such a configuration is preferable in order to facilitate determination of the relative positional relationship of the lock plate 66 to the lock gear 68, configuration may be made such that the opening portions are set with a size enabling one tooth worth of the tooth tips of the lock teeth to be seen when viewed along the take-up shaft axial direction.

Appropriate combinations may be implemented of above exemplary embodiment and the plural modification examples described above.

What is claimed is:

1. A webbing take-up device comprising:
   a take-up shaft on which a webbing is taken up;
   a lock mechanism comprising a lock gear disposed at one axial direction end portion of the take-up shaft and formed with ratchet teeth, and
   a lock plate formed with lock teeth capable of engaging with the ratchet teeth, rotation of the take-up shaft in a webbing pullout direction being prevented by the lock teeth engaging with the ratchet teeth under specific circumstances; and
   a frame comprising a pair of leg plates disposed at both axial direction end portions of the take-up shaft so as to face each other along a take-up shaft axial direction, an opening portion being formed at a leg plate of the pair of leg plates disposed further to the other axial direction end portion of the take-up shaft than the ratchet teeth and the lock teeth, and the opening portion passing through the leg plate at a position that faces towards a range including a mutual engagement position between the ratchet teeth and the lock teeth and the periphery of the engagement position along the take-up shaft axial direction,
   wherein radially extending portions are formed at both axial-direction end portions of the take-up shaft, and at least one cut-out portion is formed on the periphery of each of the radially extending portions at positions that face the opening portions of the leg plates along the axial direction of the take-up shaft, the cut-out portions being provided radially along the periphery of the extending portions of the take-up shaft,
   wherein the ratchet teeth of the lock gear extend further in the radial direction than the cut-out portions,
   wherein the lock mechanism is configured to cover the opening portion at an outer side of the leg plate of the frame, and
   wherein the cut-out portions are disposed adjacent to the lock gear in the axial direction of the take-up shaft such that said mutual engagement portion between the ratchet teeth and the lock teeth is visible through the opening portion passing through the leg plate after the lock mechanism is assembled over the leg plate due to the alignment of the mutual engagement portion and the opening portion in the axial direction of the spool and the absence of any intervening structural components between the opening portion and the mutual engagement portion that would obstruct such visibility.

2. The webbing take-up device of claim 1, wherein the leg plate of the frame disposed further to the other axial direction end portion of the take-up shaft than the ratchet teeth and the lock teeth includes a substantially circular hole for receiving the take-up shaft, and wherein the opening portion is formed by a radial protrusion of the substantially circular hole.

* * * * *